United States Patent
Nardini et al.

(10) Patent No.: US 7,774,758 B2
(45) Date of Patent: Aug. 10, 2010

(54) SYSTEMS AND METHODS FOR SECURE DEBUGGING AND PROFILING OF A COMPUTER SYSTEM

(75) Inventors: Lewis Nardini, Richardson, TX (US); Manisha Agarwala, Richardson, TX (US); Oliver P. Sohm, Toronto (CA)

(73) Assignee: Texas Instruments Incorporated, Dallas, TX (US)

( * ) Notice: Subject to any disclaimer, the term of this patent is extended or adjusted under 35 U.S.C. 154(b) by 1122 days.

(21) Appl. No.: 11/383,467

(22) Filed: May 15, 2006

(65) Prior Publication Data

US 2006/0259726 A1 Nov. 16, 2006

Related U.S. Application Data

(60) Provisional application No. 60/681,427, filed on May 16, 2005, provisional application No. 60/681,561, filed on May 16, 2005.

(51) Int. Cl.
 *G06F 9/44* (2006.01)
(52) U.S. Cl. .................. 717/127; 717/124; 717/126; 717/130; 717/131; 717/134; 714/38; 714/25; 714/47
(58) Field of Classification Search .................. 717/124, 717/126–128, 130–131, 134, 135, 138–140; 714/38, 25, 47, E11.01, 11.179, E11.202, 714/E11.2, 49, 57; 711/163, 144; 710/260; 712/215

See application file for complete search history.

(56) References Cited

U.S. PATENT DOCUMENTS

| | | | | |
|---|---|---|---|---|
| 4,251,883 A | * | 2/1981 | Grants et al. | 714/57 |
| 5,655,073 A | * | 8/1997 | Nishikado et al. | 717/124 |
| 5,809,450 A | * | 9/1998 | Chrysos et al. | 702/186 |
| 5,884,059 A | * | 3/1999 | Favor et al. | 712/215 |
| 5,923,872 A | * | 7/1999 | Chrysos et al. | 712/244 |
| 6,000,044 A | * | 12/1999 | Chrysos et al. | 714/47 |
| 6,070,009 A | * | 5/2000 | Dean et al. | 717/130 |
| 6,092,180 A | * | 7/2000 | Anderson et al. | 712/200 |
| 6,223,293 B1 | * | 4/2001 | Foster et al. | 713/300 |
| 6,360,338 B1 | * | 3/2002 | Johnson et al. | 714/49 |
| 6,622,184 B1 | * | 9/2003 | Tabe et al. | 710/36 |

(Continued)

OTHER PUBLICATIONS

Title: Fetch Halting on critical load misses , author:Mehta et al, source: IEEE, publication date: 2004.*

(Continued)

*Primary Examiner*—Chameli C Das
(74) *Attorney, Agent, or Firm*—Robert D. Marshall, Jr.; W. James Brady; Frederick J. Telecky, Jr.

(57) ABSTRACT

The present disclosure describes methods and systems for secure debugging and profiling of a computer system. Some illustrative embodiments may include a system including a processor with a first processing stage and a first attribute register associated with the first processing stage, and including a memory system coupled to the processor. An instruction and an attribute value are stored within the memory system, wherein the instruction is loaded into the first processing stage and the attribute value is loaded into the first attribute register. Export of debug and profiling data from the first processing stage is disabled if the attribute value in the first attribute register indicates that the instruction in the first processing stage is a secure instruction, and further indicates that secure emulation is disabled.

18 Claims, 3 Drawing Sheets

U.S. PATENT DOCUMENTS

| | | | |
|---|---|---|---|
| 7,093,081 B2 * | 8/2006 | DeWitt et al. | 711/144 |
| 7,237,081 B2 * | 6/2007 | Dahan et al. | 711/163 |
| 7,257,657 B2 * | 8/2007 | DeWitt et al. | 710/260 |
| 2003/0140205 A1 * | 7/2003 | Dahan et al. | 711/163 |
| 2004/0143714 A1 * | 7/2004 | Watt | 711/163 |

OTHER PUBLICATIONS

Title: ProfileMe: hardware support for instruction-level profiling on out-of-order processors, author:Dean et al, source: IEEE, publication date: 1997.*

* cited by examiner

| PAGE ATTRIBUTE TABLE (PAT) ENTRY | | |
|---|---|---|
| RESERVED | SECURITY<br>NS   EMU | RESERVED |
| 31                                  8 | 7              6 | 5                           0 |

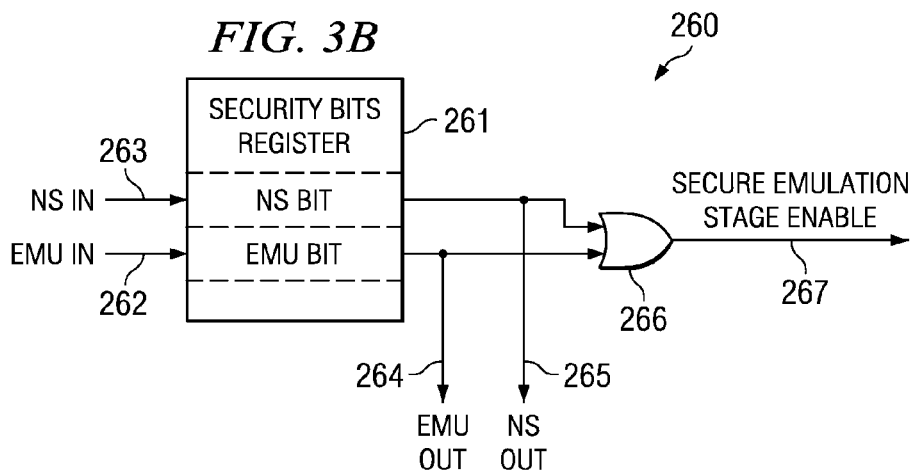
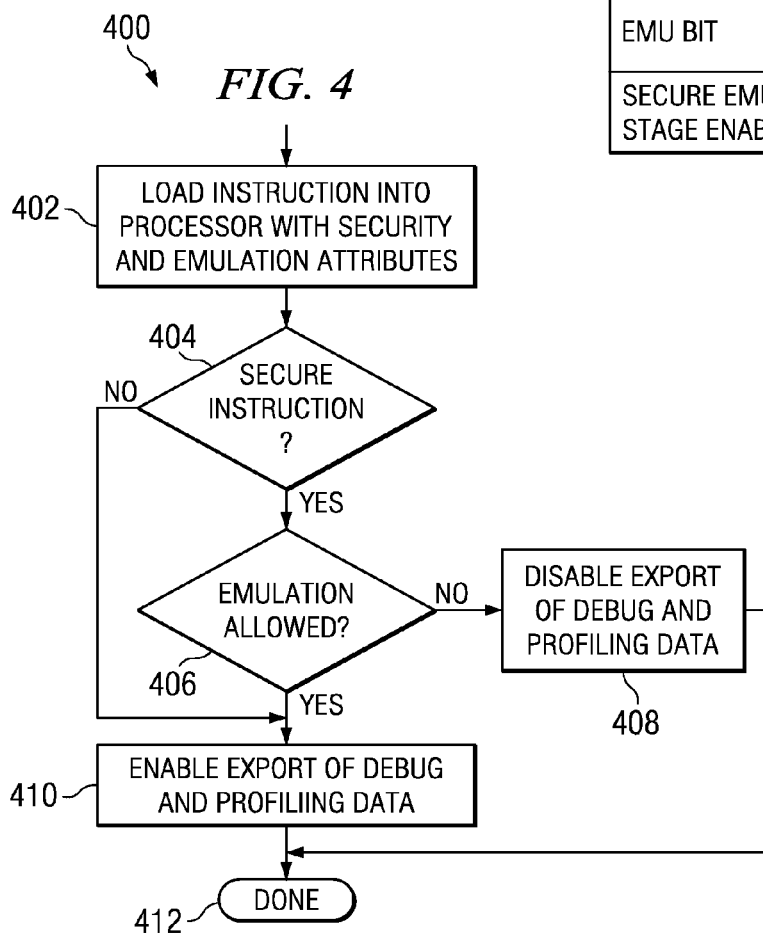

SYSTEMS AND METHODS FOR SECURE DEBUGGING AND PROFILING OF A COMPUTER SYSTEM

CROSS-REFERENCE TO RELATED APPLICATIONS

The present application claims the benefit of provisional application Ser. No. 60/681,561, filed May 16, 2005 and entitled "Debugging applications with overlays, run-time relocatable code and multi-tasking," and provisional application Ser. No. 60/681,427, filed May 16, 2005 and entitled "Debugging software-controlled cache coherence," both of which are herein incorporated by reference. The present application is also related to non-provisional application U.S. Ser. No. 11/383,425, filed May 15, 2006 and entitled "Systems and Methods for Controlling Access to Secure Debugging and Profiling Features of a Computer System," which is also herein incorporated by reference.

BACKGROUND

The increase in the complexity of modern microprocessors has created a comparable increase in the complexity of the tools used to debug and profile such microprocessors. In-circuit emulators have given way to microprocessors with built-in debug and test ports, through which external computer systems, running debug and test software, communicate with the microprocessor to debug problems and profile the performance of software executing on the microprocessor within a target system. But debug and test ports may be used by a malicious user to bypass security measures implemented within a microprocessor. Regardless of whether such security measures are implemented in hardware or software, the debug and test ports can potentially give a malicious user access to secure portions of a computer system that might otherwise be protected from unauthorized access during non-debug and non-test modes of operation.

SUMMARY

The present disclosure describes systems and methods for secure debugging and profiling of a computer system. Some illustrative embodiments may include a system including a processor with a first processing stage and a first attribute register associated with the first processing stage, and including a memory system coupled to the processor. An instruction and an attribute value are stored within the memory system, wherein the instruction is loaded into the first processing stage and the attribute value is loaded into the first attribute register. Export of debug and profiling data from the first processing stage is disabled if the attribute value in the first attribute register indicates that the instruction in the first processing stage is a secure instruction, and further indicates that secure emulation is disabled.

Other illustrative embodiments may include a method that includes loading an instruction into a processor, allowing debug and profiling data to be exported from the processor if the instruction executes at a secure level and the emulation permission allows secure emulation, and preventing debug and profiling data from being exported from the processor if the instruction executes at a secure level and the emulation permission does not allow secure emulation.

Yet further illustrative embodiments may include a processor that includes a processor core with a first processing stage and a first attribute register associated with the first processing stage. An instruction is loaded into the first processing stage and an attribute value is loaded into the first attribute register. Export of debug and profiling data from the first processing stage is disabled if the attribute value in the first attribute register indicates that the instruction in the first processing stage is a secure instruction, and further indicates that secure emulation is disabled.

BRIEF DESCRIPTION OF THE DRAWINGS

For a detailed description of some illustrative embodiments of the invention, reference will now be made to the accompanying drawings in which:

FIG. 3B shows secure emulation storage and decode logic, in accordance with at least some illustrative embodiments;

FIG. 3C shows a truth table for the secure emulation storage and decode logic of FIG. 3B; and FIG. 4 shows a secure debugging and profiling method, in accordance with at least some illustrative embodiments.

NOTATION AND NOMENCLATURE

Certain terms are used throughout the following discussion and claims to refer to particular system components. This document does not intend to distinguish between components that differ in name but not function. In the following discussion and in the claims, the terms "including" and "comprising" are used in an open-ended fashion, and thus should be interpreted to mean "including but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

Additionally, the term "system" refers to a collection of two or more parts and may be used to refer to an electronic system such as a computer system or a portion of a computer system. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. The discussion of any embodiment is meant only to be illustrative of that embodiment, and not intended to intimate that the scope of the disclosure, including the claims, is limited to that embodiment.

Figures 1, 2:
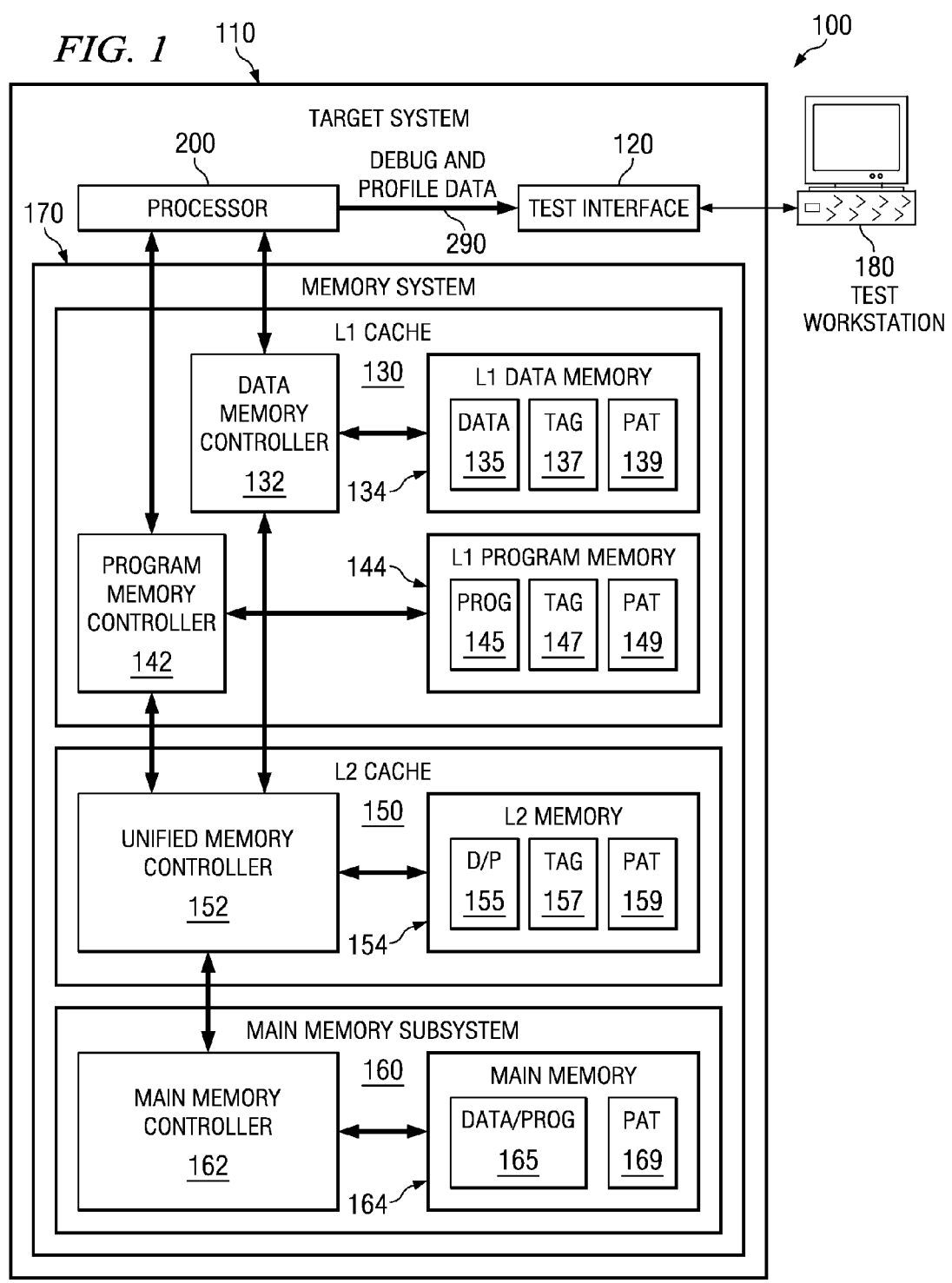
FIG. 1 shows a system for testing and debugging a target system, in accordance with at least some illustrative embodiments.
FIG. 2 shows a page attribute table entry, in accordance with at least some illustrative embodiments.

FIG. 1 shows a system 100 for debugging and testing a target system 110, which comprises a processor 200 constructed in accordance with at least some illustrative embodiments of the invention. Processor 200 couples to test interface (Test I/F) 120, which couples to test workstation 180. Test workstation 180 provides the user with a display of debug and profiling information for target system 110, and permits the user to control the testing of target system 110. Processor 200 also couples to memory system 170, which comprises level 1 cache memory (L1 Cache) 130 (the highest cache level with the fastest memory), level 2 cache memory (L2 Cache) 150 (the lowest cache level with memory slower than the memory of the L1 cache), and main memory subsystem 160 (with memory slower than the memory of both the L1 and L2 caches). L1 cache 130, which is the first level of a multilevel cached memory system, includes data memory controller 132 and program memory controller 142, which each couple to processor 200. Data memory controller 132 couples to L1 data memory 134, which includes cached data (Data) 135, cached data tag information (Tag) 137, and data page attribute table (PAT) 139. Similarly, program memory controller 142 couples to L1 program memory 144, which includes cached program instructions (Prog) 145, cached instruction tag information (Tag) 147, and program page attribute table (PAT) 149.

Data memory controller 132 and program memory controller 142 each couple to unified memory controller 152, which is part of L2 cache 150. L2 cache 150 also includes L2 memory 154, which also couples to unified memory controller 152. L2 memory 154 includes cached data and program instructions (D/P) 155, cached data and program tag information (Tag) 157, and data and program page attribute table (PAT) 159. Unified memory controller 152 couples to main memory controller 162, which is part of main memory subsystem 160. Main memory subsystem 160 also includes main memory 164, which also couples to main memory controller 162. Main memory 164 includes data and program information 165, as well as data and program page attribute table (PAT) 169.

When processor 200 reads an instruction or data from memory, an attempt is made to first retrieve the instruction or data from L1 cache 130. If the instruction or data is not located within L1 cache 130, an attempt is subsequently made to read the instruction or data from L2 cache 150. If the instruction or data is located in L2 cache 150, L1 cache 130 may be updated to include the instruction or data from L2 cache 150 (making it available in L1 cache 130 for subsequent reads), and processor 200 may proceed with processing the instruction or data. If the instruction or data is not located within L2 cache 150, the instruction or data is read from main memory subsystem 160. L1 cache 130 and L2 cache 150 may be updated to include the instruction or data read.

Processor 200, in accordance with at least some embodiments, is capable of executing code within two different execution modes, supervisor mode and user mode. In supervisor mode, all functions of processor 200 are available to the program executing on the processor. In user mode, the program executing on processor 200 is blocked from executing some instructions and from accessing some control registers within the processor. This prevents an unprivileged program from bypassing the management of hardware by supervisory software. Processor 200 is also capable of operating at two different security levels, a secure level and a non-secure level. Resources (e.g., memory pages) within target system 110 are configured to operate at one of the two security levels, and programs executing while the processor is operating at a non-secure level are blocked from accessing resources configured as secure resources.

Security levels may be defined in a number of different ways depending upon the design of processor 200. For example, in a single-stage processor, the security level reflects the security level of the instruction being executed by the processor. The security level of the instruction in turn depends upon the security level of the resource that stores the instruction (e.g., an instruction stored within a read-only memory that is configured as a secure resource is a secure instruction). Thus, if a single stage processor executes an instruction read from a secure memory, the instruction is a secure instruction and the processor is operating at a secure level.

Alternatively, if processor 200 is a pipelined processor with multiple execution stages operating simultaneously, each stage operates at one of the defined security levels, independently of some or all other stages, Accordingly, the security level of each stage reflects the security level of the instruction being processed by that stage. Thus, if a secure instruction is being processed by an instruction fetch stage while a non-secure instruction is being processed by an instruction decode stage, the instruction fetch stage is operating at a secure level, and the instruction decode stage is operating at a non-secure level. Many alternative ways of defining security levels of a processor or processor stage, applicable to many types of processors, will become apparent to those skilled in the art, and all such definitions and processor types are intended to be within the scope of the present disclosure.

By combining multiple processor execution modes with resource specific security levels, target system 110 can be configured to include "trusted" resources. These resources are configured to operate, execute and/or be accessed while processor 200 is operating in supervisor mode by instructions loaded by the processor from a secure resource. Because the resource is secure, it may only be accessed by trusted code, and if the resource is a modifiable medium (e.g., a flash memory), the contents of the resource (i.e., the trusted code) may only be modified by the trusted code. Thus, for example, target system 100 is configured to initialize processor 200 in a supervisor mode, and to initially load and execute code from a secure region of non-volatile memory (e.g., an electrically erasable programmable read-only memory (EEPROM)).

Trusted code executed upon boot-up of the target system 110 may be part of a basic input and output system (BIOS), or may be the core portion (kernel) of an operating system. In at least some embodiments, the trusted code configures the system for operation, and configures other selected resources as secure resources. By storing the BIOS or kernel code in a secure resource, the code is protected from modification by other programs, even if those programs are executing in supervisor mode. Only trusted code stored in a secure resource, such as the BIOS or kernel code itself, can make modifications to any portion of the trusted code (assuming the device within which the code is stored is writeable). Because trusted code is used to initialize the security configuration of the system before any other code executes, the secure resources of the system are also protected from unauthorized access or other tampering upon boot-up.

As noted above, a page attribute table is maintained within each memory (e.g., L1 data, L1 program, L2, and Main). In accordance with at least some embodiments, each page attribute table has a plurality of entries wherein each entry determines, among other things, the security level of a page of the corresponding memory. Thus, for example, entries within page attribute table 149 determine the security level of memory pages within L1 program memory 144. Further, as instructions or data are updated within a particular cache level, the page attribute table entry (corresponding to the page of memory where the instruction or data is stored) is also updated to reflect the page attribute table entry of the source providing the updated instructions or data.

For example, if an attempt at reading data from L1 cache 130 results in a cache miss, but the data is stored in L2 cache 150, the attribute corresponding to the memory page in L1 cache 130 where the data is stored is updated with the attribute corresponding to the memory page where the data is stored in L2 cache 150. Thus, as instructions or data ripple through the cache memory system, the attributes associated with the memory pages where the instructions or data are stored also ripple through the page attribute tables within each level of cache memory. It should be noted that each of the page attribute tables are each maintained within secure areas of memory to prevent unauthorized access and/or modification of the contents of the page attribute table. Thus, only trusted code and/or secure hardware may modify the contents of the page attribute tables.

FIG. 2 illustrates an example of how some of the bits of a page attribute table entry may be used to determine the security level of an instruction, and to also control the export of debug and profiling information. The non-secure (NS) bit within the security field of the page attribute table entry shown reflects the security level of the page to which the entry corresponds. Thus, if a program instruction is read from main memory 164, and the corresponding entry within page attribute table 169 indicates that the page is a secure page, the instruction read will be executed by processor 200 at a secure level and will be allowed to access other secure resources. The page attribute table entry shown in FIG. 2 also includes a secure emulation (EMU) bit within the security field. This bit, when combined with the non-secure bit, provides the ability to control the exportation of information when debugging and profiling a trusted applications using test interface 120. As already noted, in a pipelined architecture, the security level of a given pipeline stage reflects the security level of the instruction being executed by that pipeline stage. In accordance with at least some embodiments, the security level of the instruction being executed is tracked by providing a register for at least some of the pipeline stages which each stores the security field bits of the page attribute table entry corresponding to the instruction being executed.

Figure 3A:
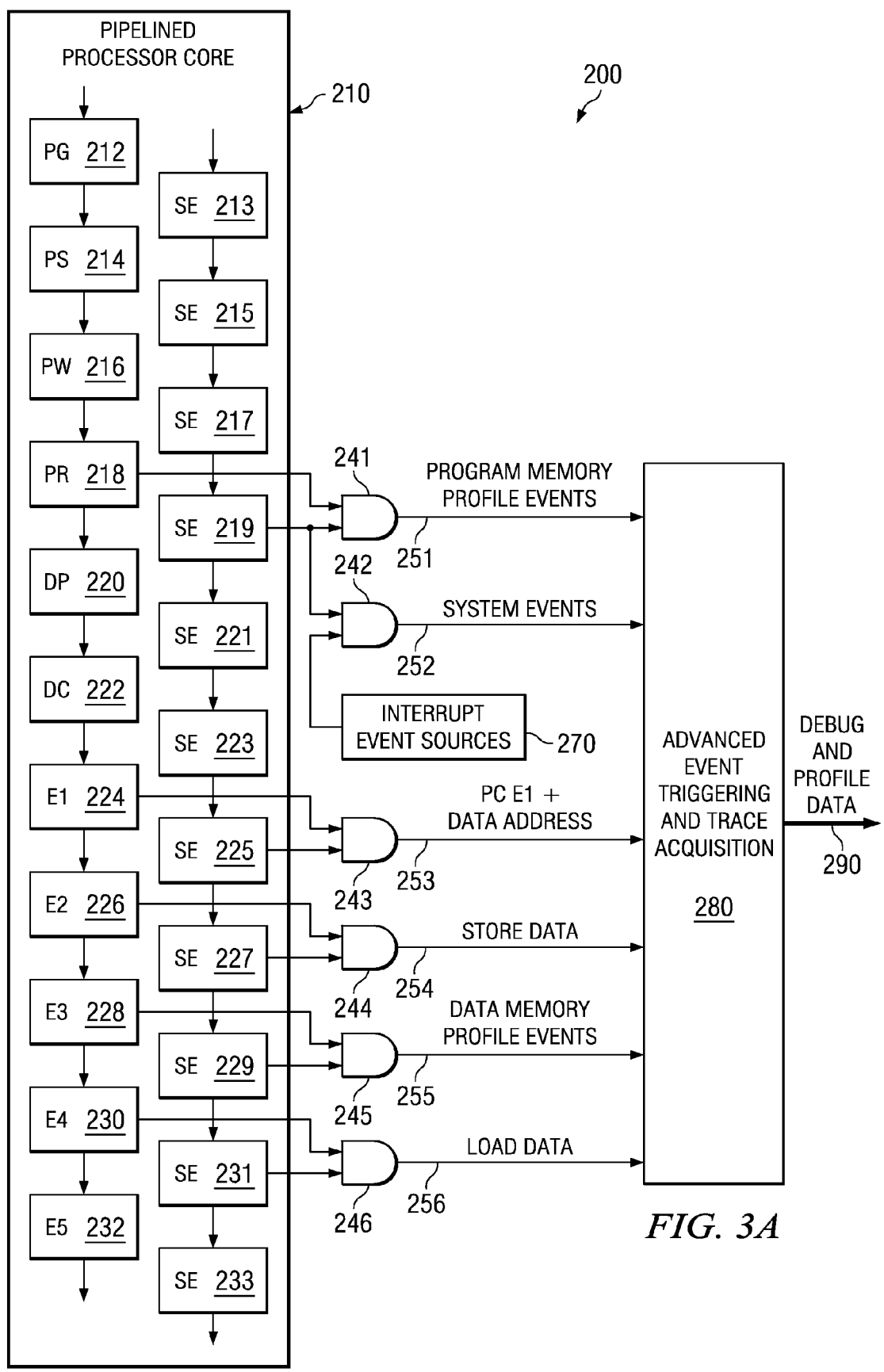
FIG. 3A shows a target system, in accordance with at least some illustrative embodiments.

FIG. 3A illustrates an example of an embodiment of a pipelined processor core 210, which provides secure emulation storage and decode logic (including a register as the storage element) for storing the security bits of an instruction executing at each pipeline stage. These stages include program address stage (PG) 212, program send address stage (PS) 214, program wait stage (PW) 216, program read stage (PR) 218, dispatch stage (DP) 220, decode stage (DC) 222, and execution stages (E1 through E5) 224, 226, 228, 230 and 232. Each of the pipeline stages has a corresponding security bits storage and decode logic element (SE 213, 215, 217, 219, 212, 223, 225, 227, 229, 231, and 233). For example program read stage 218 has a security designation determined by SE 219. SE 219 stores both the non-secure bit and the secure emulation bit for the instruction executed by program read stage 218. A program instruction and the corresponding security bits enter the pipeline at the program address stage 212 and SE stage 213 respectively. Both the program instruction and the security bits are synchronously shifted through the processor core pipeline until both have been processed by all of the pipeline stages in sequence as indicated by the arrows between stages shown in FIG. 3A.

The non-secure and secure emulation bits at each stage are stored and combined as shown in the illustrative embodiment of secure emulation storage and decode logic 260 of FIG. 3B, which is representative of the SE stages in FIG. 3A (e.g., SE 219). Secure emulation input signal (EMU In) 262 and non-secure input signal (NS In) 263 drive the respective inputs that determine the values of the EMU and NS bits of security bits register 261. These signals are driven either by values loaded from memory (e.g., from page attribute table 139 of the L1 cache 130 of FIG. 1), or by the security bits register of a preceding processor core pipeline stage (e.g., the security bits register within SE 217 of FIG. 3A). Referring again to FIG. 3B, the output of each bit of the security bits register 261, secure emulation output signal (EMU Out) 264 and non-secure output signal (NS Out) 265, are provided both as inputs to the next pipeline SE stage, and as the inputs to OR gate 266. The output of OR gate 266 (secure emulation stage enable signal 267) is used to gate debug and profile information exported by a particular processing stage (e.g., information provided via program memory profile events signal 251 of FIG. 3A).

As can be seen in logic table shown in FIG. 3C, when the non-secure bit is asserted, the output of the OR gate is asserted regardless of the state of the secure emulation bit. When the non-secure bit is not asserted, the output of the OR gate depends upon the state of the secure emulation bit. Referring back to FIG. 3A, if the program read stage 218 is executing a secure instruction (i.e., the non-secure bit is not asserted), and the secure emulation bit is asserted, the output of SE 219 will be asserted. Assertion of the output of SE 219 allows information from the program read stage to be forwarded through AND gate 241 as program memory profile events signal 251, and to be transmitted to advanced event triggering and trace acquisition logic 280, which generates debug and profile data 290. Debug and profile data 290 is forwarded to test interface 120, and subsequently to workstation 180 (FIG. 1).

Continuing to refer to FIG. 3A, other stages of pipelined processor core 210 may also be configured to provide information that is forwarded by advanced event triggering and trace acquisition logic 280 as debug and profile data 290. In the illustrative embodiment shown, program read stage 218, and execution stages 224, 226, 228, and 230 are each coupled to AND gates 241, 243, 244, 245 and 246 respectively. The information provided by each stage is gated by the output of the SE element corresponding to that stage. Each AND gate output couples to advanced event triggering and trace acquisition logic 280, and each provides information for use as debugging and profiling data. If a stage is executing a non-secure instruction, the information is available for debugging and profiling regardless of the state of the corresponding secure emulation bit. If the stage is executing a secure instruction, the information will only be available for debugging and profiling if the secure emulation bit is asserted for that instruction. If the secure emulation bit is not asserted while executing a secure instruction, the data forwarded to advanced event triggering and trace acquisition logic 280 will always be de-asserted (e.g., all zeros).

As can be see in FIG. 3A, information forwarded for debugging and profiling purposes may originate from other sources, such as interrupt event sources 270, which couples to AND gate 242 and is gated by the output of SE element 219 (corresponding to program read stage 218 of pipelined processor core 210). The output of AND gate 242 couples to advanced event triggering and trace acquisition logic, allowing information from interrupt event sources 270 to be used for debugging and profiling. Other sources, pipeline stages, and combinations of sources and pipeline stage may be used to provide information for debugging and profiling, and all such sources, pipeline stages, and combinations of sources and pipeline stages are intended to be within the scope of the present disclosure.

By using a configuration bit to control access to secure debugging and profiling information, trusted applications can be debugged without adding any special code to the program that could alter the behavior of the code being tested. Once debugging is complete, only the boot-up code is altered, and only the value of the secure emulation bits for the pages of memory where trusted applications are stored are changed. Thus, the behavior of the trusted application will remain unaltered after the secure emulation bits are de-asserted. Once the secure emulation bits are de-asserted, access to the trusted application through the test interfaces is blocked, and the trusted application is protected from unauthorized access and observation. Such protection may be necessary, for example, if the trusted application handles encryption and decryption keys stored in secure memory. Such keys should not be accessible outside of a trusted, secure environment.

FIG. 4 shows a method 400 for enabling and disabling the export of debug and profiling data from a computer system, in accordance with at least some illustrative embodiments of the invention. Although the actions of this method are presented and described serially, one of ordinary skill in the art will appreciate that the order may differ and/or some of the actions may occur in parallel. The method begins by loading an instruction, together with security and emulation attributes associated with the instruction, into a processor as shown in block 402. If the security attribute indicates that the instruction is not a secure instruction (block 404), exporting of the debug and profiling data is enabled (block 410) and the method completes (block 412). If the instruction loaded into the processor is a secure instruction (block 404), the emulation attribute is checked to determine if secure emulation is allowed (block 406). If secure emulation is allowed, exporting of debug and profiling data is enabled (block 410), and the method completes (block 412). If secure emulation is not allowed (block 406), the export of debug and profiling data is disabled (block 410), and the method completes (block 412).

The above disclosure is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
a processor comprising a first processing stage and a first attribute register associated with the first processing stage; and
a memory system coupled to the processor, an instruction and an attribute value stored within the memory system;
wherein the instruction is loaded into the first processing stage and the attribute value is loaded into the first attribute register; and
wherein export of debug and profiling data from the first processing stage is disabled if the attribute value in the first attribute register indicates that the instruction in the first processing stage is a secure instruction, and further indicates that secure emulation is disabled.

2. The system of claim 1, wherein export of the debug and profiling data from the first processing stage is enabled if the attribute value in the first attribute register indicates that the instruction in the first processing stage is a secure instruction, and further indicates that secure emulation is enabled.

3. The system of claim 1, wherein export of the debug and profiling data from the first processing stage is enabled if the value in the first attribute register indicates that the instruction in the first processing stage is a non-secure instruction.

4. The system of claim 1, wherein the processor is a digital signal processor.

5. The system of claim 1, further comprising a communications interface coupled to the processor and configured to provide test data to a workstation, the test data comprising the debug and profiling data from the first instruction stage.

6. The system of claim 1,
wherein the processor further comprises a second processing stage and a second attribute register associated with the second processing stage, the instruction transferred from the first processing stage to the second processing stage, and the attribute value transferred from the first attribute register to the second attribute register; and
wherein export of debug and profiling data from the second processing stage is disabled if the attribute value in the second attribute register indicates that the instruction in the second processing stage is a secure instruction, and further indicates that secure emulation is disabled.

7. The system of claim 6, wherein export of the debug and profiling data from the second processing stage is enabled if the attribute value in the second attribute register indicates that the instruction in the second processing stage is a secure instruction, and further indicates that secure emulation is enabled.

8. The system of claim 6, wherein export of the debug and profiling data from the second processing stage is enabled if the value in the second attribute register indicates that the instruction in the second processing stage is a non-secure instruction.

9. The system of claim 1, wherein the memory system comprises a main memory subsystem that stores a table entry comprising the attribute value, and wherein the memory system further comprises one or more levels of cache memory that each stores a copy of the table entry, the highest level of cache memory coupled to the processor, the lowest level of cache memory coupled to the main memory subsystem, and adjacent levels of cache memory coupled to each other.

10. The system of claim 1,
wherein export of additional debug and profiling data from a source within the system other than the processor is enabled if the attribute value in the first attribute register indicates that the instruction in the first processing stage is a secure instruction, and further indicates that secure emulation is enabled; and
wherein export of additional debug and profiling data from the source within the system other than the processor is disabled if the attribute value in the first attribute register indicates that the instruction in the first processing stage is a secure instruction, and further indicates that secure emulation is disabled.

11. A processor, comprising:
a processor core comprising a first processing stage and a first attribute register associated with the first processing stage;
wherein an instruction is loaded into the first processing stage and an attribute value is loaded into the first attribute register; and
wherein export of debug and profiling data from the first processing stage is disabled if the attribute value in the first attribute register indicates that the instruction in the first processing stage is a secure instruction, and further indicates that secure emulation is disabled.

12. The processor of claim 11, wherein export of the debug and profiling data from the first processing stage is enabled if the attribute value in the first attribute register indicates that the instruction in the first processing stage is a secure instruction, and further indicates that secure emulation is enabled.

13. The processor of claim 11, wherein export of the debug and profiling data from the first processing stage is enabled if the value in the first attribute register indicates that the instruction in the first processing stage is a non-secure instruction.

14. The processor of claim 11, wherein the processor is a digital signal processor.

15. The processor of claim 11,
wherein the processor core further comprises a second processing stage and a second attribute register associated with the second processing stage, the instruction transferred from the first processing stage to the second processing stage, and the attribute value transferred from the first attribute register to the second attribute register; and
wherein export of debug and profiling data from the second processing stage is disabled if the attribute value in the second attribute register indicates that the instruction in the second processing stage is a secure instruction, and further indicates that secure emulation is disabled.

16. The processor of claim 15, wherein export of the debug and profiling data from the second processing stage is enabled if the attribute value in the second attribute register indicates that the instruction in the second processing stage is a secure instruction, and further indicates that secure emulation is enabled.

17. The processor of claim 15, wherein export of the debug and profiling data from the second processing stage is enabled if the value in the second attribute register indicates that the instruction in the second processing stage is a non-secure instruction.

18. The processor of claim 11, further comprising:
one or more levels of cache memory that each stores a copy of the instruction and the attribute value;
wherein the highest level of cache memory couples to the processor core, the lowest level of cache memory is configured to couple to a main memory, and adjacent levels of cache memory couple to each other; and
wherein the highest level of cache memory provides the instruction and the attribute value to the processor core.

* * * * *